Patented Feb. 22, 1949

2,462,636

UNITED STATES PATENT OFFICE 2,462,636

ALDEHYDE-(PHENOL-PHENOL ETHER RE-
ACTION PRODUCTS) REACTION PROD-
UCTS AND METHODS FOR PRODUCING
THEM

Mortimer T. Harvey, South Orange, N. J., assignor to The Harvel Corporation, a corporation of New Jersey No Drawing. Application November 2, 1944,
Serial No. 561,633

12 Claims. (Cl. 260—46)

This invention relates to novel resinous organic condensation reaction products as well as to methods for preparing the same. This application is a continuation in part of my copending application Serial No. 461,600 filed October 10, 1942, now Patent No. 2,364,712.

In its specific aspect this invention is directed to the methods for producing the resinous organic condensation reaction products obtained by reacting material which is an aldehyde or capable of yielding an aldehyde examples of which are formaldehyde, paraformaldehyde, glyoxal, trioxymethylene, hexamethylene tetramine or furfuraldehyde, with the organic condensation reaction products produced by subjecting a mixture of a phenol free of unsaturated hydrocarbon substituents and of the class consisting of hydroxybenzene, naphthol, anthranol and their homologues with an alkyl ether of a phenol having an unsaturated hydrocarbon substituent to a condensing reaction in the presence of a katenoid condensing agent. The reaction of one of said condensation products with one or more of said aldehydes may be carried out either under acidic or alkaline conditions and the resultant resinous organic condensation reaction products are thermosetting resins which may be employed in place of the phenol-formaldehyde resins and are particularly useful in the preparation of molding powders; they may be ground into a fine dust and employed as components in brake linings; or they may be used as binders in brake linings; they may be employed with phenol-formaldehyde resins to impart alkali resistance and flexibility characteristics thereto.

In the first condensing reaction, the phenolic groups involved can be of the monohydric or the polyhydric type.

The first condensation reactions are produced with the aid of kationic agents, also termed katenoid as well as kationoid condensing agents. The expression kationic, katenoid or kationoid condensing agent is used herein and in the claims in the sense of the recent electronic postulations of Robert Robinson, compare for instance his book on "Versuch einer Elektronentheorie organischchemischer Reaktionen," Verleg Ferdinand Enke, Stuttgart 1932, especially page 16. Such agents are protons and sources of protons, such as acids, metal atoms which are able to form coordination systems with water or ammonia, sulfur from sulfur dioxide, sulfuric acid, sodium bisulfite, atoms and free radicals with incomplete electron shells and the like. Especially suitable have been found the following agents: sulfuric acid, phosphoric acid, zinc chloride, aluminum chloride, boron trifluoride, benzene sulfonic acid, hydrochloric acid and other kationoid agents. When employed solely as condensing agents they are used in small amounts and they do not enter into reaction with the above mentioned reacting compounds but remain unchanged and act, thus, catalytically.

Following are illustrative examples of phenol ethers having unsaturated hydrocarbon substituents, which are suitable for use in the practice of the present invention: alkyl ethers of cashew nut shell liquid, of the distillate, as well as the residue obtained from cashew nut shell liquid by heating said cashew nut shell liquid either at sub-atmospheric pressures or with steam, and also of the separate phenolic constituents thereof, namely, anacardic acid and cardol; alkyl ethers of cardanol, cardanal itself being obtained by distilling the anacardic acid constituent and thereby dissociating therefrom carbon and oxygen atoms other than those of the phenol nucleus and the unsaturated hydrocarbon substituent; alkyl ethers of marking nut shell liquid and the phenolic constituents thereof such as anacardol; alkyl ethers of urushiol, eugenol, isoeugenol, safrole and isosafrole.

Examples of phenolic radicles of the phenol ethers are those of hydroxybenzene (carbolic acid) and its homologues including various ones of the cresols and xylenols. Examples of unsaturated hydrocarbon substituent radicles are the hydrocarbon substituents in indene, and also the following radicles, the crotyl, allyl, the methyl and other derivatives of the allyl, the vinyl, the propenyl, the isopropenyl and the several normal and iso-alkyl and alkoxy derivatives of the vinyl, propenyl and allyl (e. g. methyl and methoxy), and the cyclohexene radicle. These radicles may be classed generally as olefinic and unsaturated cyclohydrocarbons, having an unsaturated bond at some place in the radicle.

The aryl nucleus of the phenol which can be condensed with the other substances, can be phenyl, naphthyl, anthranyl, and various of the homologues thereof such as those of the various of the cresols and xylenols and of the corresponding or analogous naphthols and anthranols.

Illustrative specific examples of phenolic ethers having an unsaturated hydrocarbon substituent reacted with other phenols are:

*Example 1*

Ethyl ether of cardanol and hydroxybenzene.

Example 2

Amyl ether of cardanol and 1,4,2-xylenol.

Example 3

Amyl ether of cashew nut shell liquid and cresylic acid.

Example 4

Diethyl ether of urshiol and Beta-naphthol.

Example 5

Eugenol and hydroxybenzene.

Example 6

Anethole and ortho cresol.

Example 7

Safrole and meta-para-cresol.

The organic condensation reaction products of said phenols with said phenol ethers are oily liquids and may be reacted with formaledhyde, paraformaldehyde, hexamethylene tetramine, trioxymethylene, glyoxal or furfuraldehyde under either acidic or alkaline conditions for the production of thermosetting resins. While the ratio of said reaction product to said aldehyde employed may vary over wide limits, I prefer that the ratio of said condensation product to said aldehyde by weight being between 1 to ½ mole and 1 to 2½ moles.

In carrying out this invention, I first make a mixture of one or more of said reaction products with one or more of said aldehydes and to this mixture may be added either any of the well known alkali or acidic condensing agents some of which have been hereinbefore specifically enumerated. Then this mixture is preferably heated to boiling and maintained in this state of boiling under a reflux condenser until there is produced a fusible thermosetting resin which in its end state is substantially dry and infusible. Instead of heating to boiling, the mixture may be placed in an oven at about 120° C. and there allowed to stand until resinification takes place.

The present invention is illustrated by the following examples which are set forth by way of illustration and not by way of limitation.

Example A.—Phenol and ethyl ether of allyl phenol

Equimolecular amounts of phenol (94 grams) and the ethyl ether of allyl phenol (162 grams) were mixed together. To this mixture was added a solution of 100 grams of concentrated sulfuric acid in 450 cc. glacial acetic acid. The entire mixture was heated to boiling under a reflux condenser and kept boiling for 5 hours. It was then poured into a large volume of water and the oil layer separated. This was distilled in vacuo. There was obtained a viscous, amber colored oil of the amount of 80 grams (product A).

50 grams of product A was added to 5 grams of hexamethylene tetramine. This mass was heated to 120° C. until a resin was produced, which resin in its end state was substantially infusible.

Example B.—Ethyl ether of cashew nut shell liquid and cresols 175 grams of the ethyl ether of cashew nut shell liquid (about ½ mole) and 55 grams of a mixture of the cresols (about ½ mole) were mixed and then chilled in ice-water. To these were added slowly 30 cc. of concentrated sulfuric acid at such a rate as to keep the temperature below 25° C. The mixture was agitated throughout the addition of the acid. The finished mixture was then allowed to stand at room temperature overnight. It was then diluted with a large volume of water and salt was added to break the emulsion. A black, viscous oil was obtained and is hereafter known as product B.

When this product B was heated with 5% of its weight of hexamethylene tetramine at 130° C., it formed a resin which when cured at 325° F. gave a tough, infusible, flexible mass.

Example C

First I make a mixture of 162 grams of ethyl ether of cardanol and 50 grams of phenol. 50 grams of concentrated sulphuric acid was added slowly to said mixture maintained at about 30° C. and while being constantly stirred. The resultant mass was allowed to stand at room temperature over night and then it was neutralized with dilute NaOH and the resultant oily condensation product known as product C was separated therefrom.

100 grams of said product C was mixed with 85 grams of an aqueous solution of formaldehyde (37½%) and to this mixture was added 10 grams of ammonia. This mixture was now placed under a reflux condenser, boiled and maintained in the state of boiling for 2 to 3 hours then the resultant mass was dehydrated under vacuum to provide a light brown liquid resin which is soluble in vegetable oils such as linseed oil and China-wood oil and may be converted to the infusible state by maintaining the same at 325° F. over night.

Example D 100 grams of product C, 10 grams of paraformaldehyde and 1 gram of diethyl sulfate were mixed together and placed in an oven at 105° C. for 16 hours and the resultant resinous condensation reaction product was a flexible infusible mass which may be readily ground to 20 mesh size and used in brake linings.

Example E 100 grams of phenol, 100 grams of the product A, B or C, 127 grams of an aqueous solution of formaldehyde (approx. 37%) and 5 grams of water solution of ammonia were heated to boiling and maintained in this state of boiling under a reflux condenser for 1½ hours, and then dehydrated under vacuum. Alcohol was added to give a solution of approximately 65 solids. This product gives excellent laminating stock for paper, cloth and wood and can be used for coatings for metals and other products.

In like manner, other alkyl ethers of the unsaturated phenols may be employed such as methyl, propyl, isopropyl, butyl isobutyl, secondary butyl, amyl, isoamyl, and the various secondary amyl groups.

While this invention has been described in detail, it is not to be limited thereby, because various modifications and changes may be made thereto without departing from the spirit thereof.

Having thus described my invention, what I claim and desire to protect by Letters Patent is:

1. A resinous organic condensation reaction product produced by heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of a phenol free of unsaturated hydrocarbon substituents and of the class consisting of hydroxybenzene, naphthol, anthranol and their homologues with an alkyl ether of a phenol having an unsaturated hydrocarbon substituent to a condensing reaction in the presence of a katenoid condensing agent.

2. A resinous organic condensation reaction product produced by heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of a phenol free of unsaturated hydrocarbon substituents and of the class consisting of hydroxybenzene, naphthol, anthranol and their homologues with an alkyl ether of cardanol to a condensing reaction in the presence of a katenoid condensing agent.

3. A resinous organic condensation reaction product produced by heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of a phenol free of unsaturated hydrocarbon substituents and of the class consisting of hydroxybenzene, naphthol, anthranol and their homologues with an alkyl ether of cashew nut shell liquid to a condensing reaction in the presence of a katenoid condensing agent.

4. A resinous organic condensation reaction product produced by heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of an alkyl ether of cardanol and hydroxybenzene to a condensing reaction in the presence of a katenoid condensing agent.

5. A resinous organic condensation reaction product produced by heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of an alkyl ether of cashew nut shell liquid and hydroxybenzene to a condensing reaction in the presence of a katenoid condensing agent.

6. A resinous organic condensation reaction product produced by heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of an alkyl ether of cardanol and a xylenol to a condensing reaction in the presence of a katenoid condensing agent.

7. The method comprising heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of a phenol free of unsaturated hydrocarbon substituents and of the class consisting of hydroxybenzene, naphthol, anthranol and their homologues with an alkyl ether of a phenol having an unsaturated hydrocarbon substituent to a condensing reaction in the presence of a katenoid condensing agent.

8. The method comprising heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of a phenol free of unsaturated hydrocarbon substituents and of the class consisting of hydroxybenzene, naphthol, anthranol and their homologues with an alkyl ether of cardanol to a condensing reaction in the presence of a katenoid condensing agent.

9. The method comprising heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of phenol free of unsaturated hydrocarbon substituents and of the class consisting of hydroxybenzene, naphthol, anthranol and their homologues with an alkyl ether of cashew nut shell liquid to a condensing reaction in the presence of a katenoid condensing agent.

10. The method comprising heat reacting in the presence of a condensing agent a material selected from the group consisting of formaldehyde, paraformaldehyde, glyoxal, hexamethylene tetramine, trioxymethylene and furfuraldehyde with an organic condensation reaction product produced by subjecting a mixture of an alkyl ether of cardanol and hydroxybenzene to a condensing reaction in the presence of a katenoid condensing agent.

11. The method comprising heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of an alkyl ether of cashew nut shell liquid and hydroxybenzene to a condensing reaction in the presence of a katenoid condensing agent.

12. The method comprising heat reacting in the presence of a condensing agent a material selected from the group consisting of formaldehyde, paraformaldehyde, glyoxal, trioxymethylene, hexamethylene tetramine and furfuraldehyde with an organic condensation reaction product produced by subjecting a mixture of an alkyl ether of cardanol and a xylenol to a condensing reaction in the presence of a katenoid condensing agent.

MORTIMER T. HARVEY.

REFERENCES CITED

The following references are of record in the file of this patent:

UNITED STATES PATENTS

| Number | Name | Date |
|---|---|---|
| 2,364,712 | Harvey | Dec. 12, 1944 |